United States Patent
Hayase et al.

(10) Patent No.: US 10,708,997 B2
(45) Date of Patent: Jul. 7, 2020

(54) LIGHT PROJECTING APPARATUS

(71) Applicant: SHARP KABUSHIKI KAISHA, Sakai, Osaka (JP)

(72) Inventors: Yukihide Hayase, Sakai (JP); Masanori Morigami, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/387,457

(22) Filed: Apr. 17, 2019

(65) Prior Publication Data
US 2019/0373705 A1 Dec. 5, 2019

Related U.S. Application Data

(60) Provisional application No. 62/680,088, filed on Jun. 4, 2018.

(51) Int. Cl.
| | |
|---|---|
| *H05B 37/02* | (2006.01) |
| *F21V 8/00* | (2006.01) |
| *G01M 11/00* | (2006.01) |
| *H05B 47/105* | (2020.01) |

(52) U.S. Cl.
CPC .......... *H05B 47/105* (2020.01); *G01M 11/33* (2013.01); *G02B 6/0006* (2013.01); *G02B 6/0008* (2013.01)

(58) Field of Classification Search
CPC . H05B 37/0227; G01M 11/33; G02B 6/0008; G02B 6/0006
See application file for complete search history.

(56) References Cited

FOREIGN PATENT DOCUMENTS

| JP | 2015-050225 A | 3/2015 |
|---|---|---|
| JP | 2017-100635 A | 6/2017 |

*Primary Examiner* — Joseph L Williams
(74) *Attorney, Agent, or Firm* — ScienBiziP, P.C.

(57) ABSTRACT

In a light projecting apparatus including a laser light source, a light projecting apparatus is divided into a laser-light-source module and a light-projecting optical module. In the laser-light-source module NOR laser beams from a plurality of laser light sources are combined by a beam combiner. The laser-light-source module and the light-projecting optical module are connected to each other by an optical fiber in a cable. A laser beam formed by the beam combiner is transmitted through the optical fiber to the light-projecting optical module, received by a fiber receptacle, and projected. In the laser-light-source module NOR a fiber-breakage countermeasure section that detects breakage of the optical fiber and takes countermeasures against the breakage is disposed.

8 Claims, 7 Drawing Sheets

LIGHT PROJECTING APPARATUS

BACKGROUND OF INVENTION

Field of Invention

The present invention relates to improvement of a light projecting apparatus including a laser light source.

Related Art

Japanese Unexamined Patent Application Publication No. 2017-100635 describes an existing technology related to a light projecting apparatus. The Publication describes a structure in which, in a railroad crossing light or the like, a light source is set near the ground, and light of the light source is guided through an optical fiber, which is disposed along a main pole of the railroad crossing light, and a signal lamp is lit at a high position on the main pole. As the optical fiber, an optical cable that is composed of a bundle of a large number of optical fibers is disposed so as to extend from the light source near the ground to the signal lamp at the high position.

Japanese Unexamined Patent Application Publication No. 2015-50225 discloses a technology that includes a plurality of laser light sources that emit laser beams having a plurality of wavelengths and that, while controlling the light amount of a laser beam having a short wavelength to be constant, controls the light amounts of laser beams having other wavelengths to be light amounts such that color balance (white balance) is maintained relative to the light amount of the laser beam having a short wavelength.

The technology described in the Japanese Unexamined Patent Application Publication No. 2017-100635 provides an advantage to perform maintenance easily without using an aerial work platform when the light source deteriorates or malfunctions by setting the light source near the ground. The technology described in the Japanese Unexamined Patent Application Publication No. 2015-50225 enables stable output optical power without allowing the light amount of the laser beam having a short wavelength to decrease by performing feedback on output power from the radiated light amount and adjusting the light amount, even if the transmittance of an optical system decreases with time.

However, with the light projecting apparatus described in the Japanese Unexamined Patent Application Publication No. 2015-50225, which includes laser light sources, it is necessary to consider safety of a laser beam for a person. In particular, with the structure described in Japanese Unexamined Patent Application Publication No. 2017-100635, in which the light source and the signal lamp are separately disposed near the ground and at a high position, because the optical cable disposed along the main pole includes a bundle of a large number of optical fibers, it is necessary to consider breakage of each of the large number of optical fibers.

For example, if the technology described in the Japanese Unexamined Patent Application Publication No. 2017-100635 is used in a laser street lamp in a busy street, there will be a high risk of a passenger getting injured due to a laser beam leak caused by the breakage of one optical fiber.

The present invention has been made in consideration of such points, and an object of the present invention is, in a light projecting apparatus using a laser light source, if the position of the laser light source and the light projecting position are separated from each other, to facilitate maintenance of an optical fiber that connects the laser light source and the light projecting position, to allow breakage of the optical fiber to be easily detected, and to provide countermeasures against the breakage.

SUMMARY OF INVENTION (1) A light projecting apparatus according to one embodiment of the present invention is a light projecting apparatus for projecting a laser beam, including a light source unit and a light projecting unit. The light source unit includes a plurality of laser light sources, an electric power source that drives the plurality of laser light sources, and a beam combiner that combines light beams emitted from the laser light sources. The light source unit and light projecting unit are connected to each other by an optical fiber that transmits light emitted from the beam combiner. The light projecting unit includes a light receiver that receives light from the optical fiber. The light projecting apparatus further includes a fiber-breakage countermeasure mechanism that detects breakage of the optical fiber and takes countermeasures against the breakage.

(2) A light projecting apparatus according to an embodiment of the present invention is the light projecting apparatus described in (1), in which the laser light sources each emit a light beam having a wavelength included in a near-infrared wavelength range from 780 nm to 1560 nm.

(3) A light projecting apparatus according to an embodiment of the present invention is the light projecting apparatus described in (1), in which the laser light sources each emit a light beam having a wavelength included in a visible-light wavelength range from 360 nm to 780 nm.

(4) A light projecting apparatus according to an embodiment of the present invention is the light projecting apparatus described in (1), in which the fiber-breakage countermeasure mechanism includes a photodetector that detects light emitted from the optical fiber to the light projecting unit.

(5) A light projecting apparatus according to an embodiment of the present invention is the light projecting apparatus described in (4), in which the photodetector is included in the light projecting unit, and the fiber-breakage countermeasure mechanism blocks emission of light from the light source unit by receiving an electric signal or radio oscillation based on detection of light by the photodetector.

(6) A light projecting apparatus according to an embodiment of the present invention is the light projecting apparatus described in (4), in which the light source unit and the light projecting unit are connected to each other by a feedback optical fiber that feeds back light received by the light receiver to the light source unit, the photodetector is included in the light source unit and detects light of the feedback optical fiber, and the fiber-breakage countermeasure mechanism blocks emission of light from the light source unit when the photodetector does not detect light.

(7) A light projecting apparatus according to an embodiment of the present invention is the light projecting apparatus described in (1), in which the light projecting unit includes a diffusing lens including a white filler, and a beam shaping lens.

(8) A light projecting apparatus according to an embodiment of the present invention is the light projecting apparatus described in (7), in which the beam shaping lens is composed of two or more lenses that are coaxially disposed.

With the structure described above, after the light beams emitted from the plurality of laser light sources in the light source unit have been combined by the beam combiner, the combined laser beam is transmitted to the light projecting unit through the optical fiber. Accordingly, the number of optical fibers that connect the light source unit and the light projecting unit can be considerably reduced to, preferably, one. Therefore, compared with a case where a large number of optical fibers are bundled, management against breakage of the optical fiber can be facilitated.

Moreover, the fiber-breakage countermeasure mechanism detects breakage of the small number of optical fibers and, when the breakage is detected, takes countermeasures, such as immediately stopping emission of a laser beam from the light source unit. Accordingly, even when the present invention is applied to a street lamp or the like, it is possible to reliably avoid exposure of a person to a laser beam.

With the present invention, it is possible to reduce the number of optical fibers that connect a light source unit and a light projecting unit, to simplify management against breakage of the optical fiber, and further to considerably reduce the risk of exposure to a laser beam even when the optical fiber breaks.

DESCRIPTION OF PREFERRED EMBODIMENTS

Hereinafter, embodiments of the present invention will be described with reference to the drawings.

First Embodiment

Figure 1:
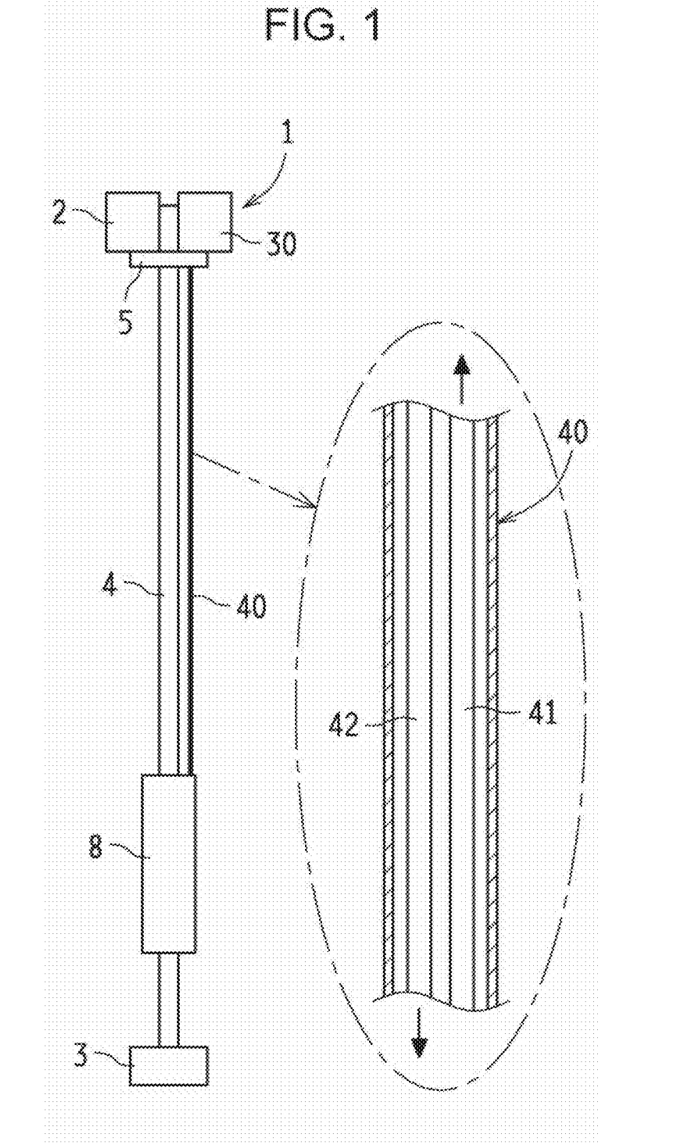
FIG. 1 is as external view of a light projecting apparatus for a monitoring camera according to a first embodiment.

FIG. 1 illustrates a first embodiment in which the present invention is applied to a light projecting apparatus for a monitoring camera.

In the figure, a light projecting apparatus 1 projects a laser beam to a field-of-view region that a monitoring camera 2 monitors and illuminates the field-of-view region. The monitoring camera 2 is disposed on a support base 5 at an upper end of a pole 4 that is set on a base 3. The monitoring camera 2 is a near-infrared monitoring camera.

The light projecting apparatus 1 includes an operation box 8 that is disposed at a position on the pole 4 near the ground, and a light-projecting optical module (light projecting unit) 30 that is disposed side by side with the monitoring camera 2 on the support base 5 at the upper end of the pole 4. The operation box 8 and the light-projecting optical module 30 are connected to each other by a cable 40.

Figure 2:
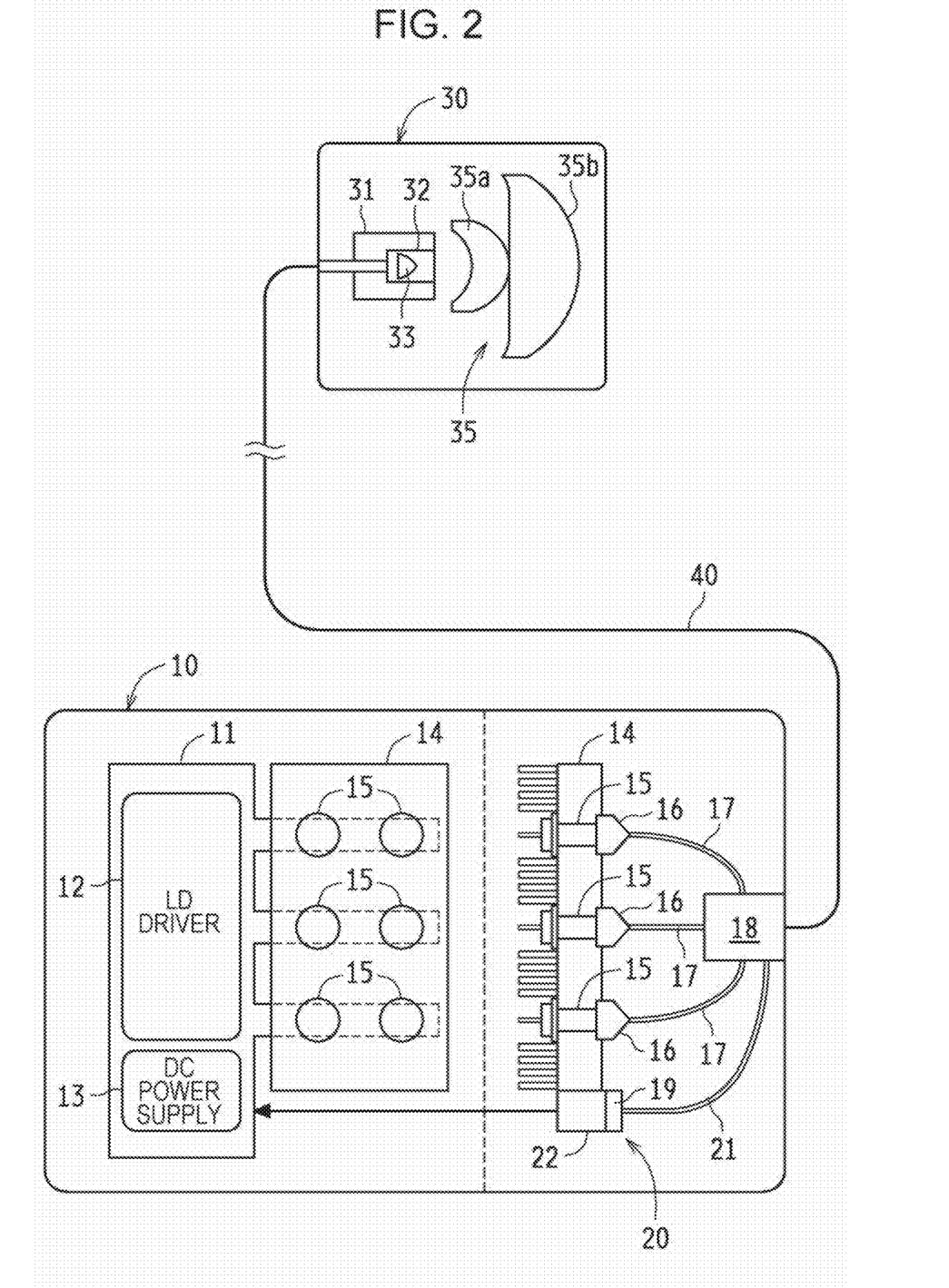
FIG. 2 illustrates the internal structures and the connection relationships of a laser-light-source module and a light-projecting optical module that are included in the light projecting apparatus.

As illustrated in FIG. 2, a laser-light-source module (light source unit) 10 is contained in the operation box 8.

In the laser-light-source module 10 illustrated in FIG. 2, a structure in a front view is shown in a region on the left side of a broken line drawn in a central part, and a structure in a side view is shown in a region on the right side of the broken line. The laser-light-source module 10 includes a laser drive controller 11 and laser light sources 15 each having a laser diode. The laser drive controller 11 includes an LD driver 12 and a DC power supply (electric power source) 13. The DC power supply 13 supplies a direct current for driving the plurality of laser light sources 15. The LD driver 12 receives the direct current from the DC power supply 13 and drives the laser light sources 15.

The number of the laser light sources 15 is plural (six in the figure), and the laser light sources 15 are fixed by using a laser-light-source fixing portion 14 so as to be arranged in three rows in the vertical direction and two columns in the left-right direction with predetermined intervals. The laser light sources 15 are driven by the LD driver 12, and the entirety of the six laser light sources 15 emits light having a wavelength included in a near-infrared wavelength range from 780 nm to 1560 nm. To be specific, for example, one wavelength included in the wavelength range from 780 nm to 1560 nm is selected, and the laser light sources 15 each emit a near infrared light beam having the same single wavelength.

Fiber connectors 16 are fixed to the laser-light-source fixing portion 14 so as to correspond to the positions of the laser light sources 15. The laser light sources 15 are connected to corresponding optical fibers 17 via the fiber connectors 16 at the corresponding positions. Accordingly, near-infrared laser beams emitted from the laser light sources 15 are transmitted to the corresponding optical fibers 17. With six laser beams from the six laser light sources 15, light-projecting output power from the light-projecting optical module 30 is increased.

The laser-light-source module 10 includes a fiber combiner (beam combiner) 18. The fiber combiner 18 includes a diffraction grating, a prism, an interference film filter, and the like. The fiber combiner 18 receives six near-infrared laser beams emitted from the six laser light sources 15 through the corresponding optical fibers 17 and combines these laser beams into one near-infrared laser beam.

In FIG. 2, the laser-light-source module 10 and the light-projecting optical module 30 are connected to each other by the cable 40. As illustrated in FIG. 1, the cable 40 includes a transmission optical fiber 41. The transmission optical fiber 41 transmits, to the light-projecting optical module 30, one combined near-infrared laser beam that is output from the fiber combiner 18 in the laser-light-source module 10 and that is in the wavelength range from 780 nm to 1560 nm.

The light-projecting optical module 30 includes a fiber receptacle (light receiver) 31 that receives one combined near-infrared laser beam transmitted from the transmission optical fiber 41.

The light-projecting optical module 30 includes a diffusing lens 33 and a beam shaping lens 35. The diffusing lens 33 is held by a lens holder 32 and diffuses the near-infrared laser beam received by the fiber receptacle 31. The diffusing lens 33 includes a white filler that is a substance having characteristics of diffusing a laser beam, such as silica, calcium carbonate, mica, or the like. The diffusing lens 33 increases the radiation angle of a laser beam so that safety is ensured even when a person sees the laser beam. In the beam shaping lens 35, a first lens 35a whose major curvature is small and a second lens 35b whose minor curvature is large are coaxially disposed. The beam shaping lens 35 adjusts the radiation angle of a near-infrared laser beam diffused by the diffusing lens 33 and shapes the beam. The near-infrared laser beam emitted from the beam shaping lens 35 is projected to the field-of-view region of the monitoring camera 2.

As illustrated in FIG. 1, the cable 40 includes a feedback optical fiber 42, in addition to the transmission optical fiber 41. One end of the feedback optical fiber 42 is connected to the light-projecting optical module 30, and the other end of the feedback optical fiber 42 is connected to the laser-light-source module 10. The feedback optical fiber 42 feeds back one combined near-infrared laser beam from the transmission optical fiber 41, which is received in the light-projecting optical module 30, from the light-projecting optical module 30 to the laser-light-source module 10.

Furthermore, the laser-light-source module 10 includes a fiber-breakage countermeasure section 20. The fiber-breakage countermeasure section (fiber-breakage countermeasure mechanism) 20 detects breakage of the transmission optical fiber 41, which transmits one near-infrared laser beam formed by the fiber combiner 18 to the light-projecting optical module 30, and further detects breakage of the feedback optical fiber 42.

That the fiber-breakage countermeasure section 20 includes one optical fiber 21 to which the other end of the feedback optical fiber 42 is connected via the fiber combiner 18 of the laser-light-source module 10, a photodiode (photodetector) 19 that detects a near-infrared laser beam transmitted to the optical fiber 21 and outputs an electric signal, and a control circuit 22. The control circuit 22 monitors detection of light by the photodiode 19, and, when light is not detected, forcibly stops supply of electricity from the DC power supply 13.

In the present embodiment, the laser-light-source module 10 emits one near-infrared laser beam in the wavelength range from 780 nm to 1560 nm, the near-infrared laser beam is transmitted to the light-projecting optical module 30 via one transmission optical fiber 41, and the near infrared light beam is projected from the beam shaping lens 35 of the light-projecting optical module 30 to the field-of-view region of the monitoring camera 2. Accordingly, the field-of-view region of the near-infrared monitoring camera 2 can be appropriately illuminated by the near-infrared laser beam having a single wavelength included in the wavelength range from 780 nm to 1560 nm. Furthermore, by using a combination of the light projecting apparatus 1 and the near-infrared monitoring camera 2, it is possible to provide a night-vision monitoring camera system utilizing a near-infrared laser beam.

The laser-light-source module 10 is contained in the operation box 8 that is disposed at a position on the pole 4 near the ground, and the light-projecting optical module 30 is disposed side by side with the monitoring camera at the upper end of the pole 4. Accordingly, compared with a case where the laser-light-source module 10 and the light projecting optical module 30 are integrated and disposed at the upper end of the pole 4, the weight of a device disposed at the upper end of the pole 4, that is, the weight and size of the light-projecting optical module 30 can be reduced, and the wind resistance and the earthquake resistance of the light-projecting optical module 30 can be improved.

Furthermore, because the laser-light-source module 10 is disposed at a position on the pole 4 near the ground, it is not necessary to use an aerial work platform when performing an operation of, for example, repairing or replacing the laser light sources 15 or repairing the DC power supply 13. Accordingly, when performing an operation of, for example, repairing or replacing the laser-light-source module 10, the operation does not occupy a space on a road where the light projecting apparatus 1 is set and does not block the traffic. Therefore, it is not necessary to restrict the traffic or to perform the operation at midnight when the traffic is light, and maintenance can be easily performed. Moreover, it is possible to improve the lightning resistance of the light projecting apparatus 1, because the light-projecting optical module 30, which is disposed at a high position, is composed of an optical system and the laser-light-source module 10, which has an electrical system, is disposed near the ground.

In addition, six near-infrared laser beams emitted from the six laser light sources 15 in the laser-light-source module 10 are combined by the fiber combiner 18 into one near-infrared laser beam that has a single wavelength included in the wavelength range from 780 nm to 1560 nm. The one near-infrared laser beam is transmitted to the light-projecting optical module 30 through one transmission optical fiber 41 in the cable 140. Accordingly, monitoring of breakage of an optical fiber that performs transmission from the laser-light-source module 10 to the light-projecting optical module 30 may be performed only on the one transmission optical fiber 41, and management of the monitoring is easy.

In the present embodiment, a part of one near-infrared laser beam transmitted from the one transmission optical fiber 41 is fed back from the light-projecting optical module 30 to the laser-light-source module 10 through the feedback optical fiber 42 in the cable 40, and is transmitted from the optical fiber 21 in the laser-light-source module 10 to the photodiode 19. Accordingly, it is possible to monitor breakage of the transmission optical fiber 41 for transmitting a near-infrared laser beam by only checking detection of light with one photodiode 19.

The transmission optical fiber 41 for transmitting a near-infrared laser beam extends from a position in the pole 4 near the ground to the upper end of the pole 4 along the pole 4. Because persons pass near the transmission optical fiber 41, it is necessary to take safety measures against breakage of the one transmission optical fiber 41. In the present embodiment, in a normal state in which there is no breakage in the transmission optical fiber 41, because one near-infrared laser beam returns into the laser-light-source module 10 through the feedback optical fiber 42, the photodiode 19 detects the one near-infrared laser beam. On the other hand, if there is a breakage in the transmission optical fiber 41, because detection of light by the photodiode 19 stops, the control circuit 22 forcibly stops supply of electricity from the DC power supply 13. As a result, because emission of six near-infrared laser beams from the six laser light sources 15 is stopped, a near-infrared laser beam does not leak from the transmission optical fiber 41, and it possible to reliably avoid exposure of a nearby person to a laser beam.

In the present embodiment, in addition to the transmission optical fiber 41 for transmitting one near-infrared laser beam, another feedback optical fiber 42 is disposed in the cable 40, and a near-infrared laser beam that has returned through the feedback optical fiber 42 is detected by using the photodiode 19. Accordingly, it is possible to reliably detect not only breakage of the transmission optical fiber 41 for transmitting one near-infrared laser beam but also breakage of the feedback optical fiber 42, and the control circuit 22 can forcibly stop supply of electricity from the DC power supply 13. Thus, even when the feedback optical fiber 42 breaks, it is possible to prevent leakage of a laser beam from the feedback optical fiber 42 and to reliably avoid exposure of a nearby person to the laser beam.

Figure 3A:
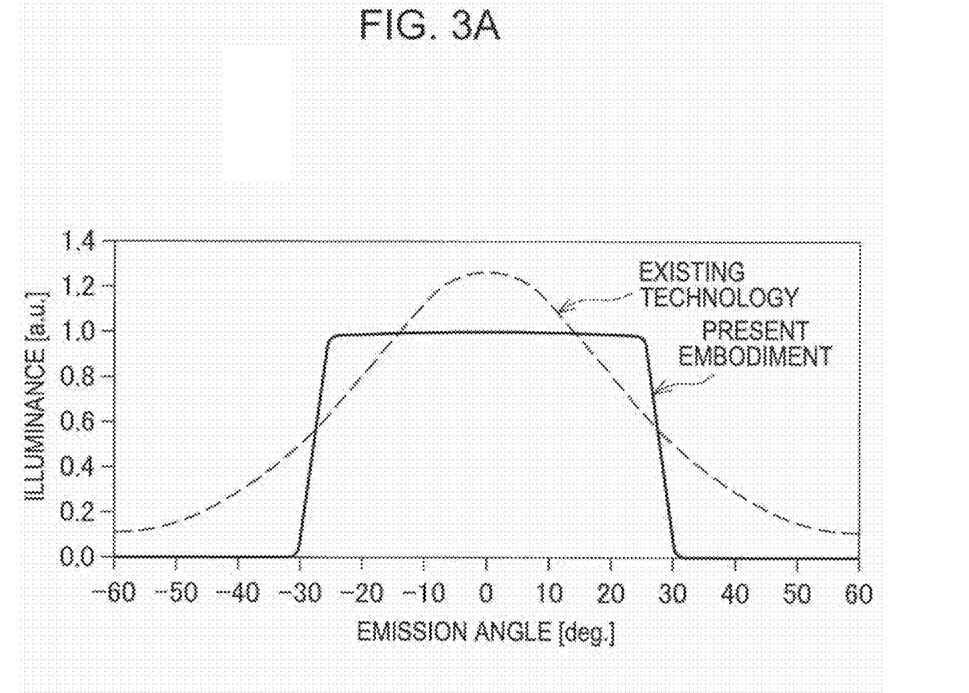
FIG. 3A illustrates the illuminance characteristic, with respect to the emission angle, of a beam shaping lens included in the light-projecting optical module.
Figure 3B:
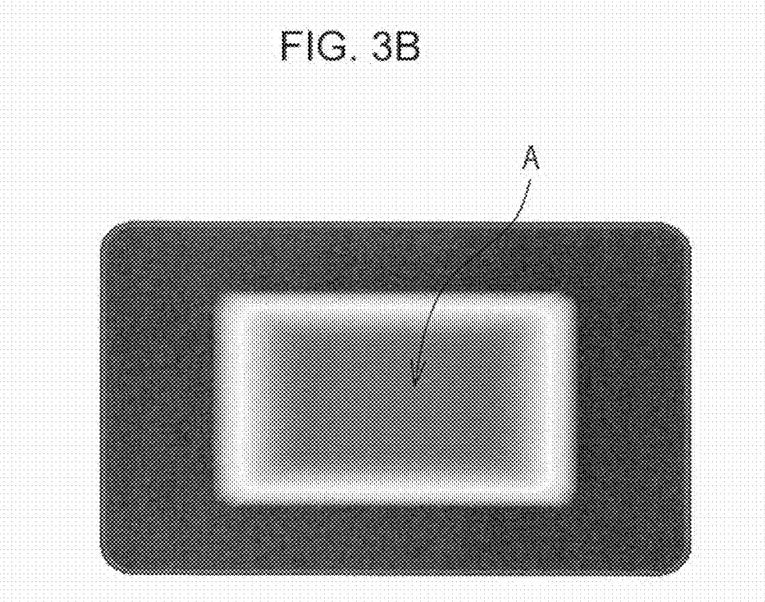
FIG. 3B illustrates an exemplary illuminance distribution of the lens.

In the light-projecting optical module 30, the two lenses 35a and 35b, which are coaxially disposed, are used as the beam shaping lens 35. Regarding the beam shaping lens 35 having this structure, as illustrated in FIG. 3(a), whereas the illuminance is high in a central part of a light projection region and the illuminance tends to considerably decrease away from the central part with existing technology (a structure with only one beam shaping lens), the beam shaping lens 35 according to the present embodiment, which has a structure with two lenses, has characteristics such that, as shown by a solid line, the illuminance sharply changes when the emission angle of a near-infrared laser beam is, for example, about 30 degrees and −30 degrees, and the boundary between a light projection region and a non-light-projection region is clear even at a distance of, for example, 100 m to 200 m. Furthermore, the illuminance is uniform in the light projection region (emission angle from −30 degrees to 30 degrees), and, as illustrated in FIG. 3(b), the illuminance is high in the entirety of the light projection region. Accordingly, it is possible to project light to only a necessary region, to obtain high light usage efficiency, and to save electric power. Moreover, because a laser beam having uniform illuminance can be projected to a monitoring target of the monitoring camera 2, occurrence of white clipping and black crushing in a captured image is reduced, and the visibility of the captured image is improved.

Although two lenses 35a and 35b are coaxially disposed in the beam shaping lens 35, naturally, three or more lenses may be coaxially disposed.

In the present embodiment, the six laser light sources 15 emit six near-infrared laser beams that have a single wavelength included in the wavelength range from 780 nm to 1560 nm. Instead, the laser light sources 15 may emit laser beams that nave a wavelength included in the visible-light wavelength range from 360 nm to 780 nm. In this case, for example, the wavelength range from 360 nm to 780 nm may be evenly divided into six ranges, and the six laser light sources 15 may respectively take charge of and emit light beams in the divided ranges. Only three laser light sources may be provided, each of the laser light sources may take charge of a corresponding one of three primary colors R (red), G (green), and B (blue) included in the visible-light wavelength range from 360 nm to 780 nm, the three laser light sources may emit visible laser beams that have three wavelengths for the three primary colors, and the light-projecting optical module 30 may project a white visible laser beam. These structures can be used as a monitoring camera system that projects a laser beam to a field-of-view region of a visible-light monitoring camera or as an ordinary light projecting apparatus for illuminating a road and nearby area, such as a street lamp in which the monitoring camera 2 is not disposed.

Second Embodiment

Figure 4:
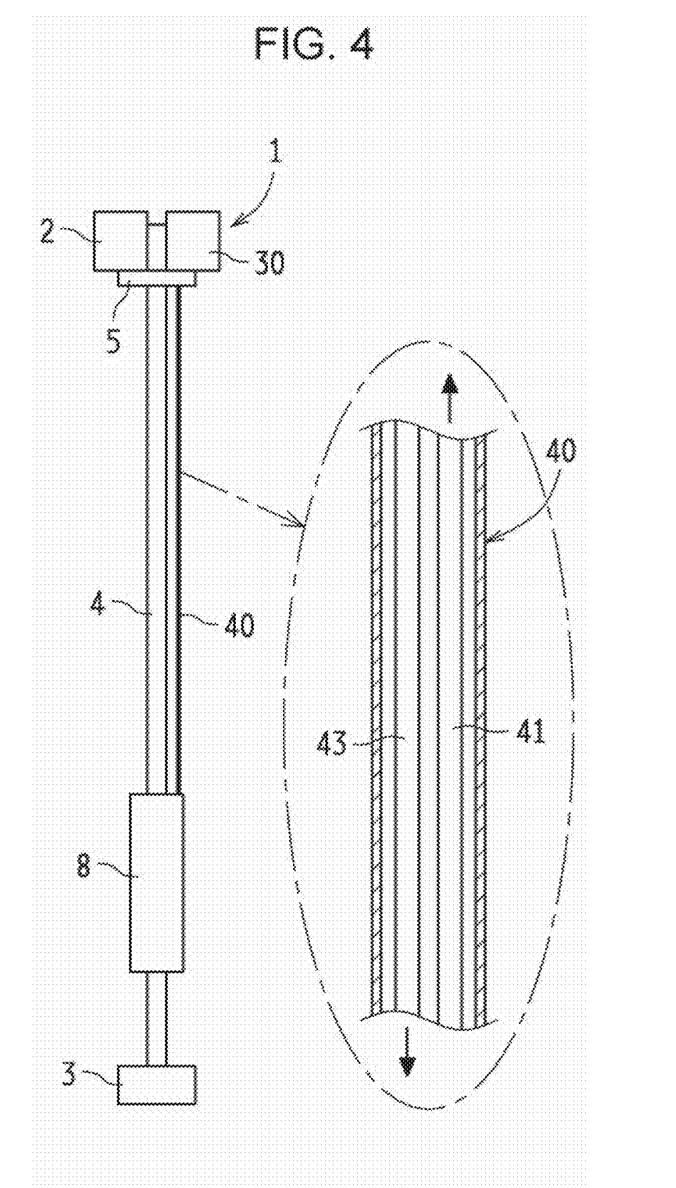
FIG. 4 is an external view of a light projecting apparatus for a monitoring camera according to a second embodiment.
Figure 5:
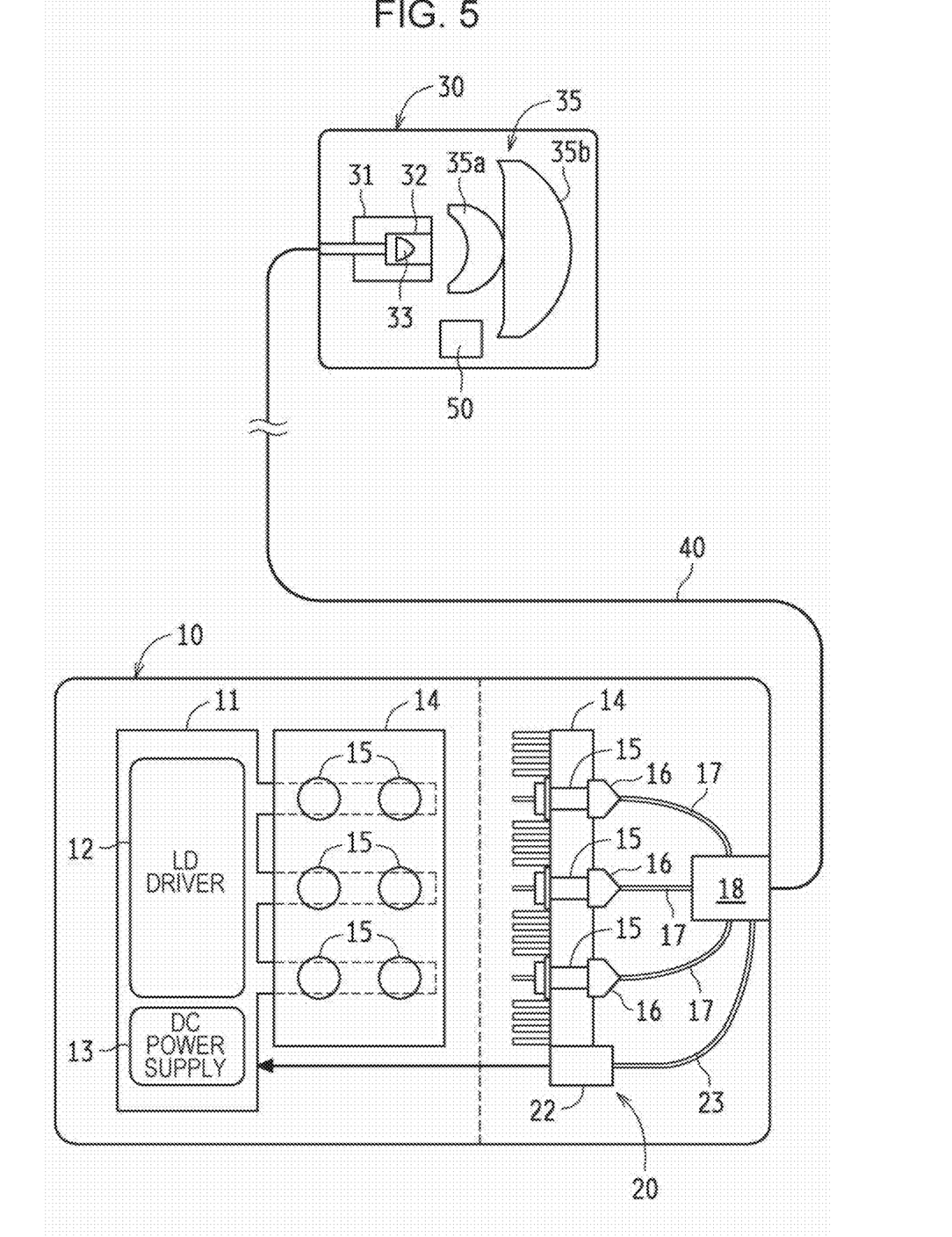
FIG. 5 illustrates the internal structures and the connection relationships of a laser-light-source module and a light-projecting optical module that are included in the light projecting apparatus.

FIGS. 4 and 5 illustrate a second embodiment in which the present invention is applied to a light projecting apparatus for a near-infrared monitoring camera.

In the first embodiment, the feedback optical fiber 42 is disposed in the cable 40, and one near-infrared laser beam transmitted to the light-projecting optical module 30 is fed back to the laser-light-source module 10. In the present embodiment, an electric signal indicating that one near-infrared laser beam is transmitted to the light-projecting optical module 30 is output to the laser-light-source module 10.

To be specific, as illustrated in FIG. 5, a photodiode 50 is disposed in the light-projecting optical module 30 as a part of the fiber-breakage countermeasure section 20. The photodiode 50 detects one near-infrared laser beam transmitted from one transmission optical fiber 41, which is disposed in the cable 40, and outputs an electric signal.

As illustrated in FIG. 4, one feedback electric wire 43 is disposed side by side with the one transmission optical fiber 41 for transmitting a laser beam in the cable 40. One end of the feedback electric wire 43 is connected to the light-projecting optical module 30, and the other end of the feedback electric wire 43 is connected to the laser-light-source module 10. When the photodiode 50, which is disposed in the light-projecting optical module 30, operates (detects light), an electric signal generated at this time is output to the laser-light-source module 10 through the feedback electric wire 43.

Furthermore, in the laser-light-source module 10, as illustrated in FIG. 5, an inner electric wire 23 that receives the electric signal from the feedback electric wire 43 is disposed in the cable 40, and the control circuit 22 is connected to the inner electric wire 23. When the control circuit 22 does not receive, through the inner electric wire 23, an electric signal that the photodiode 50 outputs when detecting light, the control circuit 22 forcibly stops supply of electricity from the DC power supply 13.

In the present embodiment, when the one transmission optical fiber 41 for transmitting a laser beam breaks, detection of light by the photodiode 50 stops and the photodiode 50 does not output an electric signal. Accordingly, an electric signal from the photodiode 50 is not transmitted to the feedback electric wire 43, and the control circuit 22 forcibly stops supply of electricity from the DC power supply 13. Therefore, emission of near-infrared laser beams from the six laser light sources 15 is stopped, and leakage of a near infrared laser beam from the transmission optical fiber 41 for transmitting a laser beam is reliably avoided.

On the other hand, even in a normal state in which the transmission optical fiber 41 for transmitting a laser beam is not broken, that is, even when the photodiode 50 in the light-projecting optical module 30 detects light, if the feedback electric wire 43 is broken, an electric signal from the photodiode 50 is not transmitted. Accordingly, also in this case, the control circuit 22 forcibly stops supply of electricity from the DC power supply 13, and thus emission of near-infrared laser beams from the six laser light sources 15 is stopped. In this case, there is no breakage in the transmission optical fiber 41 for transmitting a laser beam, and leakage of a laser beam does not occur when the laser beam is emitted. However, because the light projecting apparatus 1 stops projecting light, an operator who repairs the light projecting apparatus 1 can check breakage of the feedback electric wire 43 and can replace the feedback electric wire 43.

The present embodiment is safer against exposure to a laser beam than the first embodiment, because the number of optical fibers disposed in the cable 40 can be limited to one.

Third Embodiment

Figure 6:
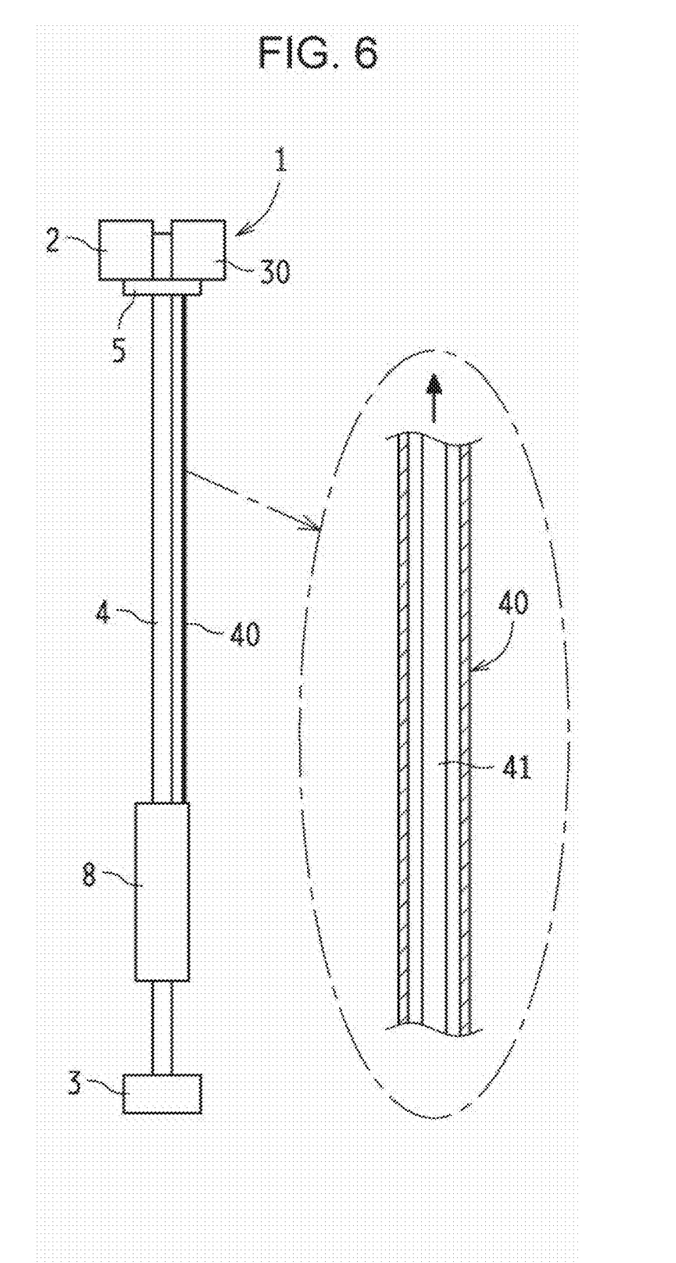
FIG. 6 is an external view of a light projecting apparatus for a monitoring camera according to a third embodiment.
Figure 7:
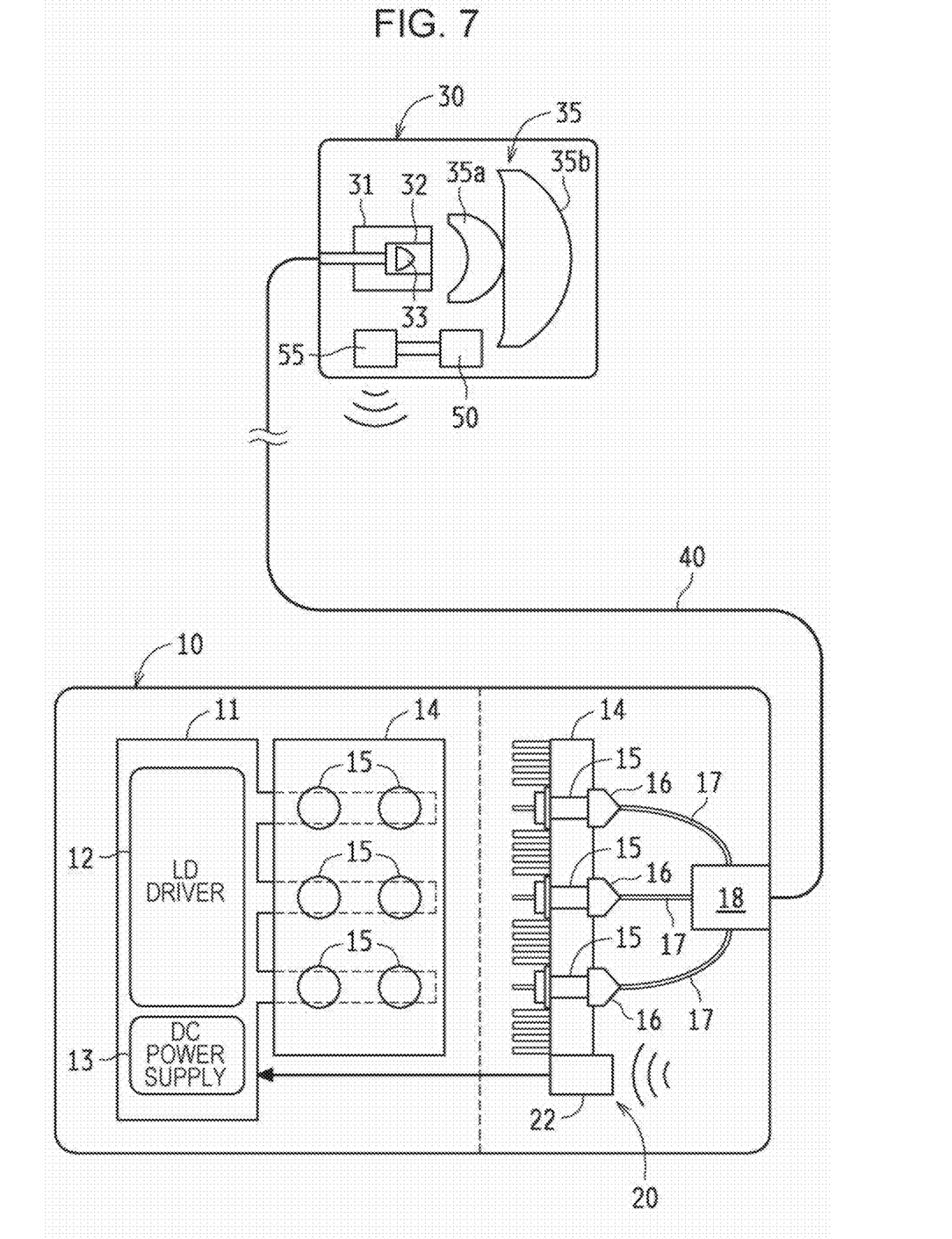
FIG. 7 illustrates the internal structures and the connection relationships of a laser-light-source module and a light-projecting optical module that are included in the light projecting apparatus.

FIGS. 6 and 7 illustrate a third embodiment in which the present invention is applied to a light projecting apparatus for a near-infrared monitoring camera.

In the second embodiment, an electric signal generated when the photodiode 50, which is disposed in the light-projecting optical module 30, detects light is fed back to the laser-light-source module 10 through the feedback electric wire 43. In the present embodiment, feedback is performed by using a radio signal.

To be specific, in FIG. 7, in the light-projecting optical module 30, in addition to the photodiode 50, which detects a laser beam from the transmission optical fiber 41 for transmitting a laser beam, a short-distance wireless oscillator 55 is disposed near the photodiode 50. The wireless oscillator 55 receives an electric signal when the photodiode 50 detects light and outputs a radio signal toward the laser-light-source module 10.

As illustrated in FIG. 6, in the cable 40, the feedback optical fiber 42 shown in the first embodiment and the feedback electric wire 43 shown in the second embodiment are not disposed, and only one transmission optical fiber 41 for laser beam transmission is disposed.

In the laser-light-source module 10, the control circuit 22 of the fiber-breakage countermeasure section 20 receives the radio signal from the wireless oscillator 55. When the control circuit. 22 does not receive a radio signal, the control circuit 22 forcibly stops supply of electricity from the DC power supply 13.

In the present embodiment, when the transmission optical fiber 41 for transmitting a laser beam breaks, detection of light by the photodiode 50 in the light-projecting optical module 30 stops, and accordingly the wireless oscillator 55 stops outputting a radio signal. Accordingly, in the laser-light-source module 10, the control circuit 22 does not receive the radio signal and forcibly stops supply of electricity from the DC power supply 13. Thus, also with the present embodiment, it is possible to reliably avoid exposure to a laser beam emitted from the broken transmission optical fiber 41 for transmitting a laser beam.

Moreover, because the feedback electric wire 43 (see FIG. 4) is not necessary in the cable 40, in contrast to the second embodiment, only one laser-beam-transmission optical fiber may be disposed in the cable 40. Accordingly, while simplifying the structure, it is possible to increase safety against exposure due to breakage of the transmission optical fiber 41 for transmitting a laser beam.

The present invention may be embodied in various other forms within the spirit and the main features thereof. Therefore, the embodiments described above are only examples and should not be interpreted as limiting. Modifications and changes within the equivalents of the claims of the present invention are all within the scope of the present invention.

The invention claimed is:

1. A light projecting apparatus for projecting a laser beam, comprising:
a light source unit and a light projecting unit,
wherein the light source unit includes a plurality of laser light sources, an electric power source that drives the plurality of laser light sources, and a beam combiner that combines light beams emitted from the laser light sources,
wherein the light source unit and light projecting unit are connected to each other by an optical fiber that transmits light emitted from the beam combiner,
wherein the light projecting unit includes a light receiver that receives light from the optical fiber, and
wherein the light projecting apparatus further includes a fiber-breakage countermeasure mechanism that detects breakage of the optical fiber and takes countermeasures against the breakage.

2. The light projecting apparatus according to claim 1,
wherein the laser light sources each emit a light beam having a wavelength included in a near-infrared wavelength range from 780 nm to 1560 nm.

3. The light projecting apparatus according to claim 1,
wherein the laser light sources each emit a light beam having a wavelength included in a visible-light wavelength range from 360 nm to 780 nm.

4. The light projecting apparatus according to claim 1,
wherein the fiber-breakage countermeasure mechanism includes
a photodetector that detects light emitted from the optical fiber to the light projecting unit.

5. The light projecting apparatus according to claim 4,
wherein the photodetector is included in the light projecting unit, and
wherein the fiber-breakage countermeasure mechanism blocks emission of light from the light source unit by receiving an electric signal or radio oscillation based on detection of light by the photodetector.

6. The light projecting apparatus according to claim 4,
wherein the light source unit and the light projecting unit are connected to each other by a feedback optical fiber that feeds back light received by the light receiver to the light source unit,
wherein the photodetector is included in the light source unit and detects light of the feedback optical fiber, and
wherein the fiber-breakage countermeasure mechanism blocks emission of light from the light source unit when the photodetector does not detect light.

7. The light projecting apparatus according to claim 1,
wherein the light projecting unit includes
a diffusing lens including a white filler, and a beam shaping lens.

8. The light projecting apparatus according to claim 7,
wherein the beam shaping lens is
composed of two or more lenses that are coaxially disposed.

* * * * *